J. A. Craig.
Grass Burner.
Nº 8,701.   Patented Feb. 3, 1852.
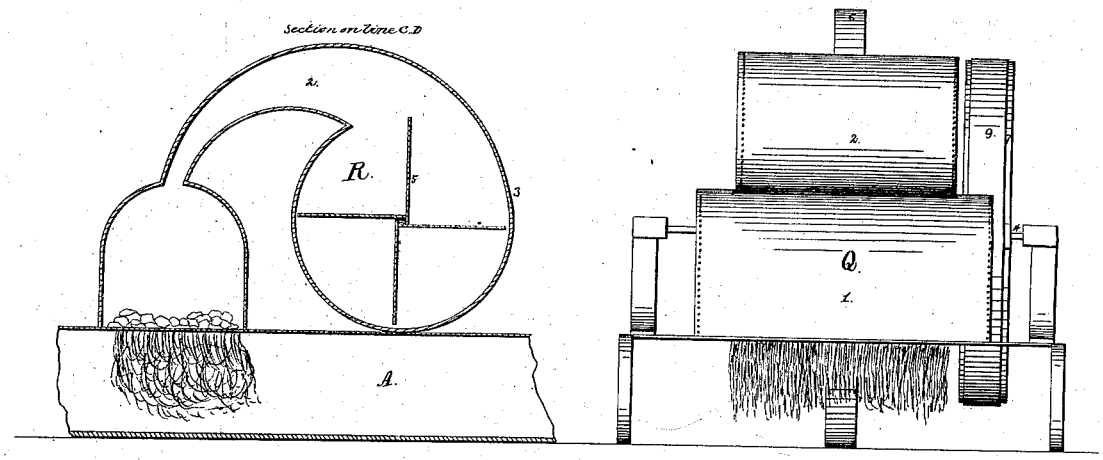
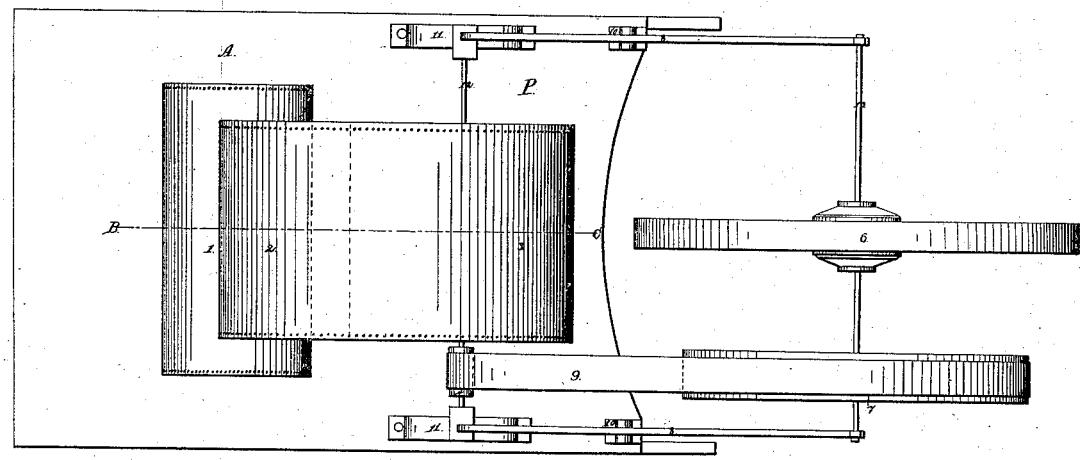
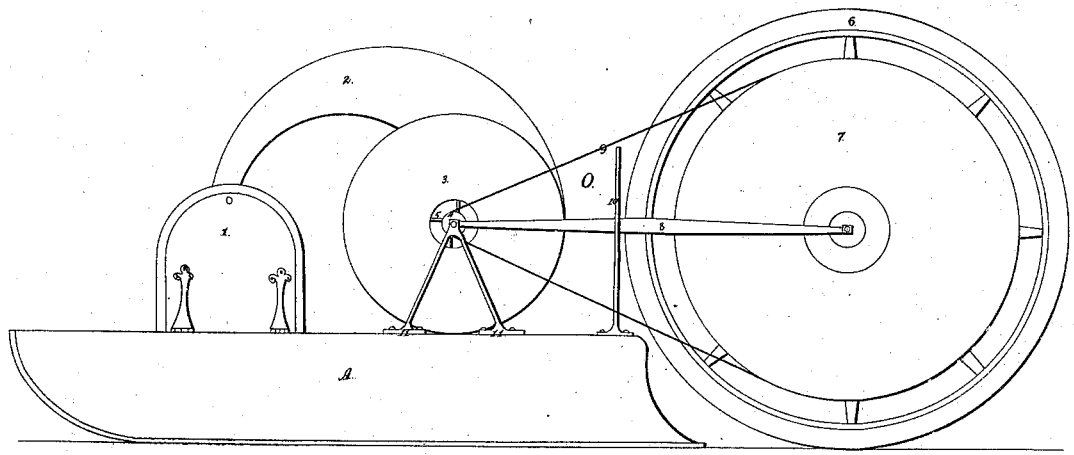

UNITED STATES PATENT OFFICE.

JOHN A. CRAIG, OF COLUMBIA, ARKANSAS.

IMPROVEMENT IN GRASS-BURNERS.

Specification forming part of Letters Patent No. 8,701, dated February 3, 1852.

*To all whom it may concern:*

Be it known that I, JOHN A. CRAIG, of the town of Columbia, in the county of Chicot and State of Arkansas, have invented a new and useful machine for burning and thereby destroying green grass, noxious weeds, insects, and combustible obstructions growing and lying upon the fields in or intended for cultivation; and I do hereby declare that the following is a full and clear description of the construction and operation of the same, reference being made to the annexed drawing, making a part of this specification, in which—

Letter O is a perspective or side view; P, a top view; Q, a front end view, and R a section or internal view.

By reference to said drawing the different members of all the parts will be understood as follows: A, rolled-iron sledge; 1, fire-box; 2, air-funnel; 3, air-barrel; 4, small drum; 5, fan for forcing the air into the fire-box; 6, wheel; 7, large or driving drum; 8, levers playing in grooved stanchions 10 to slide up and down, allowing the wheels to elevate or depress with the inequalities of the surface of the field; 9, strap connecting the driving and small drums; 10, grooved stanchions in which the levers 8 play; 11, double stanchions for bearing of fan and small drum-axle and fulcrum of levers; 12, axle on which are fixed the small drum and fan; 13, axle on which the wheel and large drum are fixed.

This machine must be made of metal, excepting the wheel and large drum and frame in which they work, which may be made either of wood or metal. It is intended to be drawn by horse-power. The wheel, being in contact with the ground, gives motion to the fan, which drives a current of air into the fire-box, forcing the flame downward through grates to the ground, and may be passed between rows of cotton, corn, sugar-cane, &c., the rows of plants being protected from the action of the heat by the runners of the sledge A.

What I claim as my invention, and desire to secure by Letters Patent, is—

The application to the surface of the ground of flames for agricultural purposes, using for that purpose the above-described machine or any other substantially the same which will by heat produce the intended effect.

JNO. A. CRAIG.

Witnesses:
T. H. CRAWFORD,
GEO. L. DOUGLASS.